US012804383B2

(12) United States Patent
Zhang et al.

(10) Patent No.: US 12,804,383 B2
(45) Date of Patent: Nov. 17, 2026

(54) INFORMATION PROCESSING METHOD, TERMINAL, AND NETWORK-SIDE DEVICE

(71) Applicant: VIVO MOBILE COMMUNICATION CO., LTD., Dongguan (CN)

(72) Inventors: Pengfei Zhang, Dongguan (CN); Xiaowan Ke, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 363 days.

(21) Appl. No.: 18/374,635

(22) Filed: Sep. 28, 2023

(65) Prior Publication Data

US 2024/0031796 A1 Jan. 25, 2024

Related U.S. Application Data

(63) Continuation of application No. PCT/CN2022/085316, filed on Apr. 6, 2022.

(30) Foreign Application Priority Data

Apr. 6, 2021 (CN) ........................ 202110369030.X

(51) Int. Cl.
*H04W 8/24* (2009.01)
*H04W 48/08* (2009.01)

(52) U.S. Cl.
CPC ............ *H04W 8/24* (2013.01); *H04W 48/08* (2013.01)

(58) Field of Classification Search
CPC ........................ H04W 68/005; H04M 15/8214
USPC ........................................................ 455/422.1
See application file for complete search history.

(56) References Cited

U.S. PATENT DOCUMENTS

2004/0066756 A1* 4/2004 Ahmavaara ........... H04W 48/18 370/328
2020/0119909 A1* 4/2020 Zhang .................. H04L 9/3247
2020/0245235 A1 7/2020 Chun
2021/0099869 A1 4/2021 Palanigounder et al.
2021/0099968 A1 4/2021 Tiwari et al.
2022/0201592 A1* 6/2022 Lindheimer .......... H04W 48/10
2024/0007314 A1* 1/2024 Yao ..................... H04L 12/1435
2024/0107317 A1* 3/2024 Salmela ................ H04W 12/72

FOREIGN PATENT DOCUMENTS

CN 107182061 A 9/2017
CN 112218287 A 1/2021
CN 112399507 A 2/2021
WO 2020152164 A1 7/2020

OTHER PUBLICATIONS

International Search Report issued in corresponding International Application No. PCT/CN2022/085316, mailed Jun. 23, 2022, 4 pages.

(Continued)

*Primary Examiner* — Fabricio R Murillo Garcia
(74) *Attorney, Agent, or Firm* — IPX PLLC

(57) ABSTRACT

An information processing method, a terminal, and a network-side device, are provided. The information processing method includes: transmitting a subscriber identity in a first format to a first network, the first network being a network accessed by a terminal.

20 Claims, 7 Drawing Sheets

(56) References Cited

OTHER PUBLICATIONS

First Office Action issued in related Chinese Application No. 202110369030.X, mailed Aug. 29, 2023, 7 pages.
Huawei et al., "Reject UE access to SNPN service via a PLMN to align with CT WG 1" 3GPP TSG_SA\\WG2, S2-2007042, Oct. 2020, 5 pages.
3GPP TSG SA, "System Architecture for the 5G System (5GS); Stage 2 (Release 17)", 3GPP TS 23.501 V17.0.0 (Mar. 2021), Mar. 2021, pp. 189 and 190.

* cited by examiner

INFORMATION PROCESSING METHOD, TERMINAL, AND NETWORK-SIDE DEVICE

CROSS-REFERENCE TO RELATED APPLICATIONS

This application is a continuation of International Application No. PCT/CN2022/085316, filed on Apr. 6, 2022, which claims priority to Chinese Patent Application No. 202110369030.X, filed Apr. 6, 2021. The entire contents of each of the above-identified applications are expressly incorporated herein by reference.

TECHNICAL FIELD

This application is directed to the technical field of mobile communications, and in particular, to an information processing method, a terminal, and a network-side device.

BACKGROUND

A network to which a terminal (also referred to as User Equipment (UE)) belongs may be a Stand-alone Non-Public; Network (SNPN), a Public Network Integrated Non-Public Network (PNI NPN) or a Public Land Mobile Network (PLMN), and may be accessed to other networks as required. The SNPN may be identified by a PLMN IDentifier (ID) of the SNPN and a Network IDentifier (NID) of the SNPN.

At this moment, a network-side device may not accurately determine the network to which the UE belongs.

SUMMARY

Embodiments of this application provide an information processing method, a terminal, and a network-side device.

According to a first aspect, an information processing method is provided. The method is applied to a first communication device, and includes:

A first communication device transmits a subscriber identity in a first format to a first network.

The first network is a network accessed by a terminal, and the first format includes one of the following:

a network access identifier format; and an international mobile subscriber identity format.

According to a second aspect, an information processing apparatus is provided. The apparatus includes:

a determining module, configured to determine a first format; and an access module, configured to transmit a subscriber identity in the first format to a first network.

The first network is a network accessed by a terminal, and the first format includes one of the following:

a network access identifier format; and an international mobile subscriber identity format.

According to a third aspect, an information processing method is provided. The method is applied to a second communication device, and includes:

A second communication device receives first information.

The second communication device executes a first operation according to the first information.

The first information includes a subscriber identity in a first format of a terminal, and the first format includes one of the following:

a network access identifier format; and an international mobile subscriber identity format.

According to a fourth aspect, an information processing apparatus is provided. The apparatus includes:

a receiving module, configured to receive first information; and an execution module, configured to execute a first operation according to the first information.

The first information includes a subscriber identity in a first format of a terminal, and the first format includes one of the following:

a network access identifier format; and an international mobile subscriber identity format.

According to a fifth aspect, a terminal is provided. The terminal includes a processor, a memory, and programs or instructions stored in the memory and executable on the processor. The programs or instructions, when executed by the processor, implement steps of the method as described in the first aspect.

According to a sixth aspect, a network-side device is provided. The network-side device includes a processor, a memory, and programs or instructions stored in the memory and executable on the processor. The programs or instructions, when executed by the processor, implement steps of the method as described in the third aspect.

According to a seventh aspect, a readable storage medium is provided. The readable storage medium stores programs or instructions. The programs or instructions, when executed by a processor, implement steps of the method as described in the first aspect or implement steps of the method as described in the third aspect.

According to an eighth aspect, a chip is provided. The chip includes a processor and a communication interface. The communication interface is coupled to the processor. The processor is configured to execute programs or instructions to implement the method as described in the first aspect or implement the method as described in the third aspect.

According to a ninth aspect, a computer program/program product is provided. The computer program/program product is stored in a non-volatile storage medium. The program/program product is executed by at least one processor to implement steps of the information processing method as described in the first aspect or steps of the information processing method as described in the third aspect.

In the embodiments of this application, a terminal transmits a subscriber identity in a first format to a first network for accessing the first network in a case that the first network is to be accessed, whereby a network-side device of the first network may accurately determine a network to which the terminal belongs.

DETAILED DESCRIPTION

Figure 1:
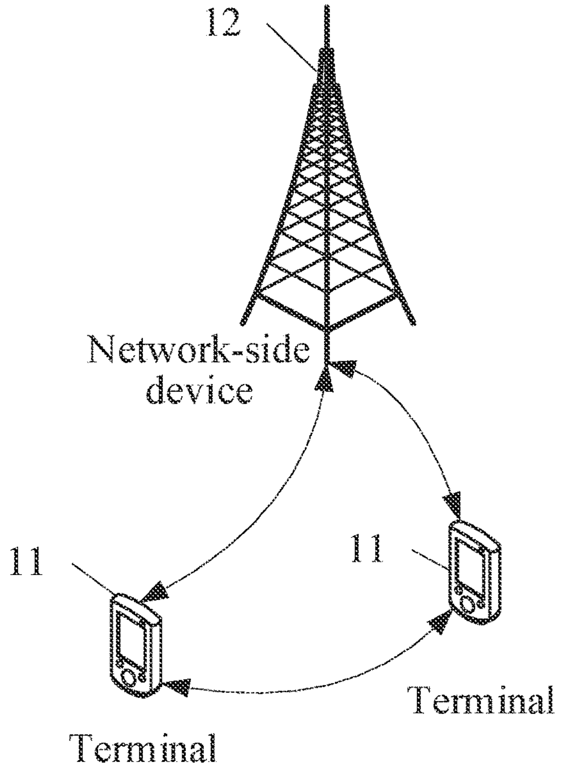
FIG. 1 shows a block diagram of a wireless communication system according to an embodiment of this application.

The embodiments of this application are described in the following with reference to the accompanying drawings in the embodiments of this application. Apparently, the described embodiments are merely some rather than all of the embodiments of this application. All other embodiments obtained by a person skilled in the art based on the embodiments of this application fall within the protection scope of this application.

The terms "first" and "second" in the specification and claims of this application are used to distinguish similar objects, but are unnecessarily used to describe a specific sequence or order. It is to be understood that the terms used in this way are exchangeable in a proper case, so that the embodiments of this application described herein can be implemented in an order different from the order shown or described herein. The objects distinguished by "first" and "second" are generally in one class, and the number of objects is not limited. For example, there may be one or more first objects. In addition, "and/or" in the specification and claims represents at least one of the connected objects, and the character "/" generally represents that the associated objects are in an "or" relation.

It is to be noted that the technologies described in the embodiments of this application are not limited to a Long Term Evolution (LTE)/LTE-Advanced (LTE-A) system, and may, further be applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), and other systems. The terms "system" and "network" in the embodiments of this application are often used interchangeably. The technology described may be applied to the systems and radio technologies mentioned above, and may also be applied to other systems and radio technologies. The following description describes a New Radio (NR) system for example purposes and uses the NR term in most of the following descriptions, but these technologies may also be applied to applications other than NR system applications, such as 6th Generation (6G) communication systems.

In order to facilitate a better understanding of the embodiments of this application, the following technical points are first described below.

SNPNs deployed by a PLMN have the same PLMN IDs correspondingly. For example, in a case that the PLMN IDs corresponding to SNPN1 and SNPN2 are the same, when an SNPN2 UE has accessed SNPN1, the same PLMN ID as an SNPN1 UE is provided. A Radio Access Network (RAN) provides an SNPN1 NID to an Access and Mobility management Function (AMF). Therefore, the AA/if may not distinguish whether an accessed UE is the SNPN1 UE or the SNPN2 UE, In addition, for example, in a case that SNPN1 is deployed by PLMN1, when both the SNPN1 UE and a PLMN1 UE access SNPN1, a SUbscription Permanent Identifier (SUPI) and/or a SUbscription Concealed Identifier (SUCI) in the format of an International Mobile Subscriber Identity (IMSI) may be provided. In this case, the SNPN1 UE and the PLMN1 UE provide the same NID to the RAN, and a Mobile Country Code (MCC)+a Mobile Network Code (MNC) of the SNPN1 UE and the PLMN1 UE received by the AMF are also the same. Therefore, the AMF may not distinguish whether the accessed UE is the SNPN1 UE or the PLMN1 UE.

At present, there are still the following problems to be solved:

Scenario 1 (shown in Table 1 below):

An access network is SNPN X.

The accessed UE is an SNPN X UE, an SNPN Y UE, or a PLMN Z UE.

TABLE 1

| UE's home network | SNPN X (Serving SNPN) | SNPN Y | PLMN Z |
|---|---|---|---|
| Serving SNPN | SNPN X | SNPN X | SNPN X |
| UE's PLMN ID | #999 | #999 | #ZZZ |
| Selected NID | NID X | NID X | NID X |
| NID of UE's home network | NID X | NID Y | Null |

For Scenario 1:

When a UE of SNPN Y accesses SNPN X, the same PLMN ID (999) as a UE of SNPN X is provided. An NID provided by the RAN to the AMF is an NID of SNPN X. Therefore, the AMF cannot distinguish whether the accessed UE is the UE of SNPN X or the UE of SNPN Y.

Scenario 2 (shown in Table 2 below):

An access network is SNPN X, and SNPN X is deployed by PLMN Z.

The accessed UE is an SNPN X UE, an SNPN Y UE, or a PLMN Z UE.

TABLE 2

| UE's home network | SNPN X (Serving SNPN) | SNPN Y | PLMN Z |
|---|---|---|---|
| Serving SNPN | SNPN X | SNPN X | SNPN X |
| UE's PLMN ID | #ZZZ | #999 | #ZZZ |
| Selected NID | NID X | NID X | NID X |
| NID of UE's home network | NID X' | NID Y | Null |

For Scenario 2:

When SNPN X is deployed by PLMN Z, both the UE of SNPN X and the UE of PLMN Z may provide a SUPI/SUCI in an IMSI format when accessing SNPN X. In this scenario, the UE of SNPN X and the UE of PLMN Z provide the same NID to the RAN, and the MCC+MNC of the UE of SNPN X and the UE of PLMN Z received by AMF are also the same. Therefore, the AMF may not distinguish whether the accessed UE is the UE of SNPN X or the UE of PLMN Z.

For the above two scenarios, two methods are provided:

Method 1:

All UEs may only use an *SUI* and/or SUCI in an NAI format when accessing the SNPN:

The SUPI and/or SUCI in the NAI format is composed of username @realm, where the realm part represents a home network of the UE.

Method 2:

When the UE accesses the SNPN through the SUPI and/or SUCI in the IMSI format, a selected NID and/or an index of the NID are provided to the RAN, and an NID and/or an index of the MD of the home network of the UE are additionally provided. The provision manners include an NAS message or an RRC message.

In some implementations, the operation of accessing a first network by adopting a subscriber identity in a network access identifier format includes accessing the first network by adopting only the subscriber identity in the network access identifier format.

In an implementation, a network identifier includes an NID for identifying information in a stand-alone non-public network. For example, an identifier of the SNPN is MD information in PLMN ID+NID.

In an implementation, a network to which a terminal belongs includes: a subscription network of the terminal.

A connection control method and apparatus and a communication device provided by the embodiments of this application may be applied to a network system below. The network system includes: a terminal, a Radio Access Network (RAN)-side device, and a Core Network (CN)-side device.

In an embodiment of this application, the communication device may include at least one of the following: a communication device and a terminal.

In an embodiment of this application, the communication device may include at least one of the following: a core network-side device and a radio access network-side device.

In the embodiments of this application, the core network-side device may include but is not limited to at least one of the following: a core network device, a core network node, a core network function, a core network-side device, a Mobility Management Entity (MME), an Access Management Function (AMF), a Session Management Function (SMF), a User Plane Function (UPF), a Serving Gate Way (SGW), a PDN gate way, a Policy Control Function (Pen, a Policy and Charging Rules Function (PCRF), a Serving GPRS Support Node (SGSN), a Gateway GPRS Support Node (GGSN), a Unified Data Management (UDM), a. Unified Data Repository (UDR), a Home Subscriber Server (HSS), an Application Function (AF), and a Centralized Network Configuration (CNC).

In the embodiments of this application, the radio access network-side device may include but is not limited to at least one of the following: a radio access network device, a radio access network node, a radio access network function, a radio access network unit, a Third Generation Partnership Project (3GPP) radio access network, a non-3GPP radio access network, a Centralized Unit (CU), a Distributed Unit (DU), a base station, an evolved Node B (evolved Node B (eNB), a 5G base station (gNB), a Radio Network Controller (RNC), a base station (NodeB), a Non-3GPP Inter Working Function (N3IWF), an Access Controller (AC) node, an Access Point (AP) device or a Wireless Local Area Networks (WLAN) node, and N3IWF.

The base station may be a Base Transceiver Station (BTS) in a Global System for Mobile communications (GSM) or a Code Division Multiple Access (CDMA) network, or may be a NodeB in Wideband Code Division Multiple Access (WCDMA), or may be an evolutional base station (eNB or e-NodeB, evolutional Node B) and a 5G base station (gNB) in LTE. The embodiments of this application are not limited thereto.

In the embodiments of this application, the terminal may include a relay supporting a terminal function and/or a terminal supporting a relay function. The terminal may also be referred to as a terminal device or User Equipment OA). The terminal may be a terminal-side device such as a mobile phone, a tablet personal computer, a laptop computer, a Personal Digital Assistant (PDA), a Mobile Internet Device (MID), a wearable device, or Vehicle User Equipment (VUE). It is to be noted that the specific type of the terminal is not limited in the embodiments of this application.

In some implementations, obtaining or acquisition may be understood as obtaining from configuration, receiving, receiving after request, obtaining through self-learning, deriving from unreceived information or obtaining after processing according to received information, which may be determined according to actual needs. The embodiments of this application are not limited thereto.

The transmission in some implementations may include broadcasting, broadcasting in a system message, returning after responding to a request, dedicated signaling transmission, and the like.

The following describes the embodiments of this application with reference to the accompanying drawings in the embodiments of this application. Apparently, the described embodiments are some embodiments of this application rather than all of the embodiments. All other embodiments obtained by those of ordinary skill in the art based on the embodiments of this application without creative efforts shall fall within the protection scope of this application, FIG. 1 shows a block diagram of a wireless communication system to which embodiments of this application may be applied. The wireless communication system includes a terminal 11 and a network-side device 12. The terminal 11 may also be referred to as a terminal device or UE. The terminal 11 may be a terminal-side device such as a mobile phone, a tablet personal computer, a laptop computer or a notebook computer, a PDA, a palmtop computer, a netbook, an Ultra-Mobile Personal Computer (UMPC), an MID, a wearable device, or VUE, and Pedestrian User Equipment (PUE) The wearable device includes: smart watches, bracelets, headphones, glasses, and the like. It is to be noted that the specific type of the terminal 11 is not limited in the embodiments of this application. The network-side device 12 may be a base station or a core network. The base station may be referred to as a node B, an evolved node B, an access point, a Base Transceiver Station (BTS), a radio base station, a radio transceiver, a Basic Service Set (BSS), an Extended Service Set (ESS), a node B, an evolved node B (eNB), a home node B, a home evolved node B, a WLAN access point, a WiFi node, a Transmitting Receiving Point (TRP), or some other suitable term in the art. The base station is not limited to a particular technical vocabulary as long as the same technical effect is achieved. It is to be noted that only a base station in an NR system is used as an example in the embodiments of this application, but a specific type of the base station is not limited.

The information processing method provided by the embodiments of this application will be described in detail with reference to the accompanying drawings through some embodiments and application scenarios thereof.

Figure 2:
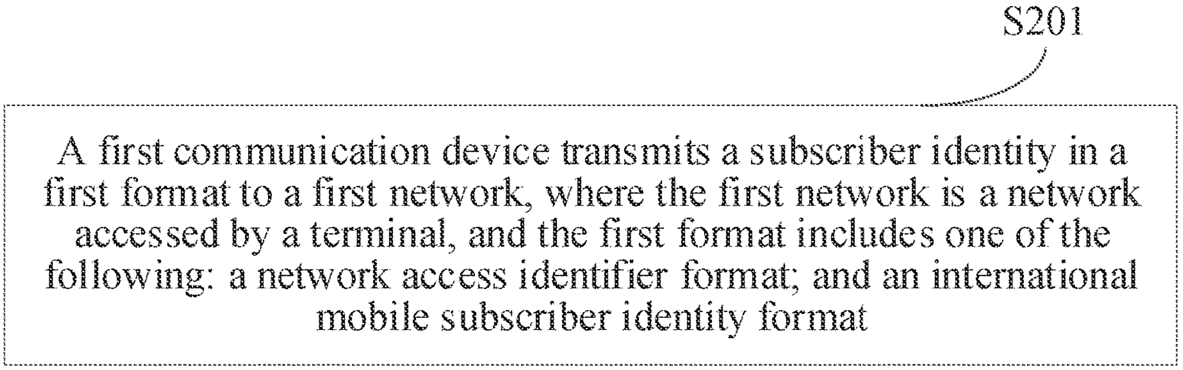
FIG. 2 shows a flowchart of an information processing method according to an embodiment of this application.

FIG. 2 shows a schematic flowchart of an information processing method according to an embodiment of this application. The method may be performed by a first communication device. The first communication device may be a terminal of a second network. In other words, the method may be performed by software or hardware installed at the terminal.

S201: The first communication device transmits a subscriber identity in a first format to a first network. The first network is a network accessed by a terminal, and the first format includes at least one of the following:

a Network Access Identifier (NAI) format; and an International Mobile Subscriber Identity (IMSI) format.

It is to be understood that the subscriber identity includes at least one of the following: SUPI and SUCI.

The terminal adopts the subscriber identity the first format to access the first network in a case that the first network is to be accessed.

In an implementation, a UE of the second network may adopt the subscriber identity in the NAI format or the IMSI format for accessing the first network.

In an implementation, a PLMN UE may select the subscriber identity in the NAI format for accessing the first network.

The network-side device of the first network may determine the network to which the terminal belongs according to the subscriber identity in the first format. That is, it is determined that the UE is an SNPN UE currently providing services, or another SNPN UE, or a PLMN UE, or a UE of another network type, for example, a PNI NPN.

In an implementation, a network to which the UE belongs may be a subscription network of the LE. In an implementation, the operation of accessing a first network by adopting a subscriber identity in a network access identifier format includes accessing the first network by adopting only the subscriber identity in the network access identifier format.

In an implementation, a network identifier includes an NID for identifying information in a stand-alone non-public network. For example, an identifier of the SNPN is NID information in PLMN ID+NID.

The terminal may access the first network with the SUPI and/or SUCI in the NAI format or with the SUN and/or SUCI in the IMSI format according to actual needs.

Therefore, according to the information processing method implemented by the embodiments of this application, a terminal transmits a subscriber identity in a first format to a first network for accessing the first network in a case that the first network is to be accessed, whereby a network-side device of the first network may accurately determine a network to which the terminal belongs.

Figure 3:
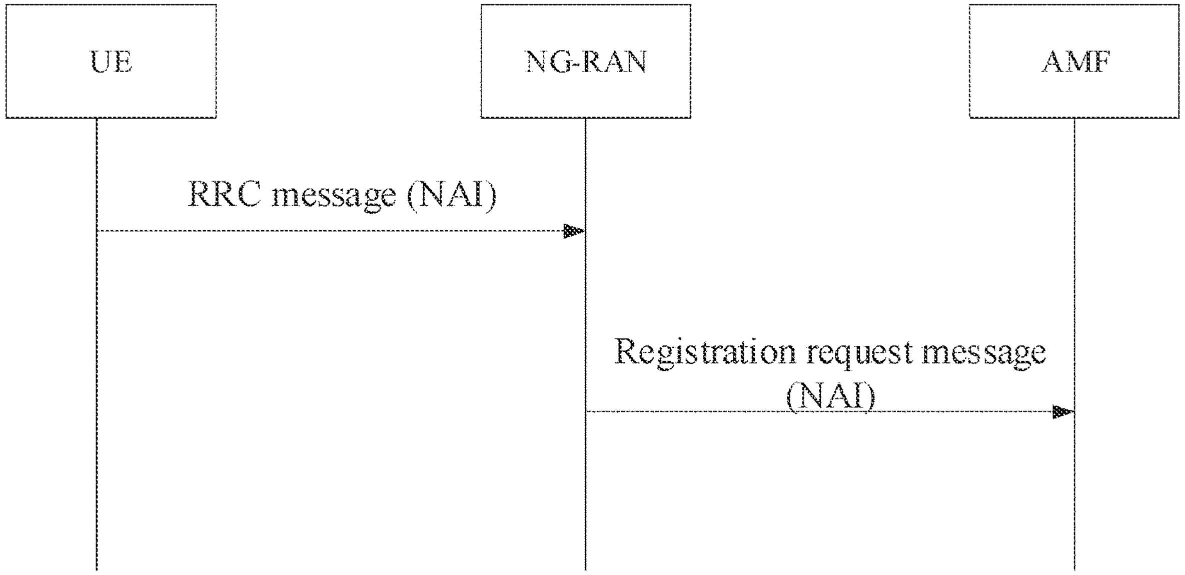
FIG. 3 shows a schematic information transmission diagram of an information processing method according to an embodiment of this application.

FIG. 3 shows a schematic information transmission diagram of an information processing method according to an embodiment of this application. Based on the foregoing embodiments, in some implementations, S201 includes:

transmitting the subscriber identity in the network access identifier format to the first network in a case that a first condition is satisfied.

As shown in FIG. 3, the terminal only provides the SUN and/or SUCI in the NAI format to the network-side device. Specifically, the terminal transmits a Radio Resource Control (RRC) message including the subscriber identity in the NAI format to a base station (e.g., NG-RAN), and the NG-RAN transmits a registration request message including the subscriber identity in the NAI format to an WE.

In an implementation, the first condition includes at least one of the following:

The first network is a stand-alone non-public network.

the first communication device is a terminal of the second network; and

A public land mobile network identifier of the second network is different from a public land mobile network identifier of the first network.

The second network is one of the following: a stand-alone non-public network, a public land mobile network, and an integrated non-public network. The integrated non-public, network may be a PNI NPN.

It is to be understood that the SUN and/or SUCI in the NM format is composed of username @realm, where the realm part represents a network to which the UE belongs. Therefore, the network-side device of the first network may accurately determine a network to which the UE belongs based on the SUPI and/or SUCI in the NAI format.

In an implementation, the terminal of the second network may access the first network only with the subscriber identity in the NAI format in a case that the first network is an SNPN. The second network may be an SNPN which is the same as or different from the first network, or may be a PLMN having a PLMN ID which is the same as or different from that for identifying the first network, or may be another network type, for example, an integrated non-public network.

In another implementation, an SNPN of an SNPN UE is the second network. The SNPN UE may access the first network only with the subscriber identity in the NAI format in a case that the first network is the SNPN.

In another implementation, a PLMN of a PLMN UE is the second network. The PLMN UE may access the first network only with the subscriber identity in the NAI format in a case that the first network is an SNPN and a PLMN ID of the second network is the same as a PLMN ID for identifying the first network.

In another implementation, the terminal may access the first network with the subscriber identity in the NAI format or the IMSI format in a case that the second network is not the SNPN and the PLMN ID of the second network is different from the PLMN ID of the first network.

Therefore, according to the information processing method implemented by the embodiments of this application, a terminal transmits a subscriber identity in an NAI format to a first network in a case that a first condition is satisfied, whereby a network-side device of the first network may accurately determine a network to which the terminal belongs.

Figure 4:
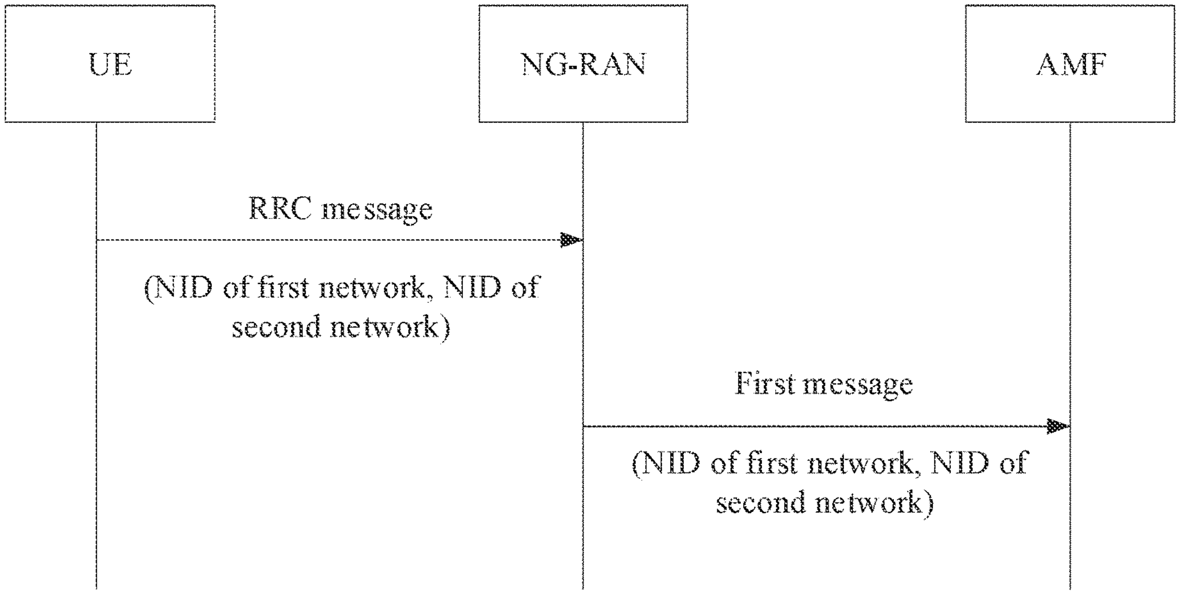
FIG. 4 shows another schematic information transmission diagram of an information processing method according to an embodiment of this application.
Figure 5:
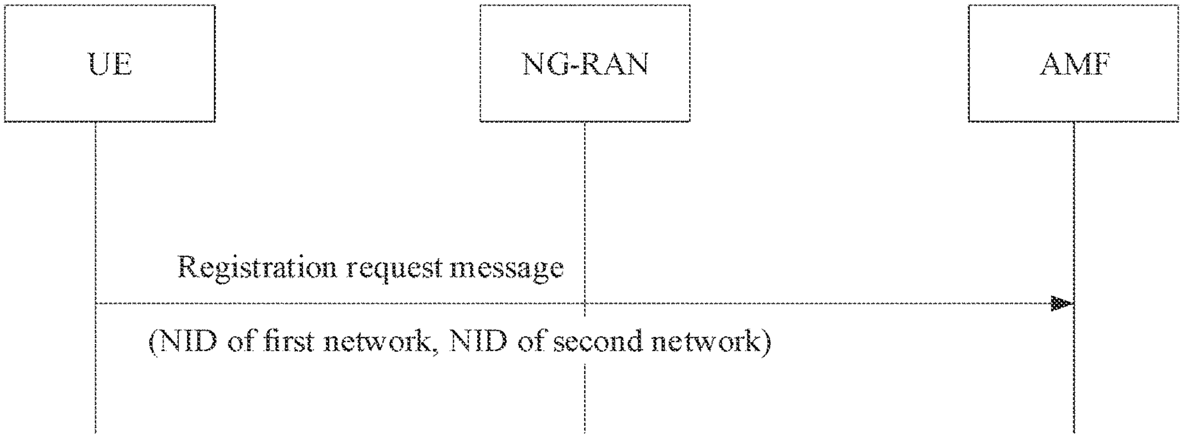
FIG. 5 shows another schematic information transmission diagram of an information processing method according to an embodiment of this application.

FIG. 4 and FIG. 5 show another schematic information transmission diagram of an information processing method according to an embodiment of this application, respectively. Based on the foregoing embodiments, in some implementations, S201 includes:

A first communication device transmits a subscriber identity in an international mobile subscriber identity format to a first network.

The first communication device transmits a network identifier of a second network and/or an index of the network identifier to the first network in a case that a second condition is satisfied.

The second network is a network to which the terminal belongs.

The network identifier of the second network and a PLMN identifier in the subscriber identity in the international mobile subscriber identity format uniquely identify the second network together, or the network identifier of the second network is a network identifier for identifying information of a stand-alone non-public network.

The index of the network identifier is used for indexing the network identifier of the second network.

When a UE accesses the first network through a SUFI and/or SUCI in an IMSI format and information for identifying the first network to be accessed is provided to an RAN, an MD of a network to which the UE belongs and/or an index of the NID are additionally provided, namely an MD of the second network and/or an index of the MD.

In some implementations, the second condition includes at least one of the following:

The first network is a stand-alone non-public network.

The first communication device is a terminal of a second network.

The second network is one of the following: a stand-alone non-public network, a public land mobile network, and an integrated non-public network.

In an implementation, a PLMN of a PLMN UE is the second network. In a case that the UE is pulled into the first network through the SUN in the IMSI format, if the PLMN UE cannot provide an additional NID of a network to which the UE belongs and/or an index of the NID, a network-side device of the first network may determine that the LE is the PLMN UE in a case that the additional NID of the network to which the UE belongs and/or the index of the NID is not received.

In another implementation, an SNPN of an SNPN UE is the second network. In a case that the UE accesses the first network through the SUPI in the IMSI format, an additional NID of a second network and/or an index of the NID will be provided to the network-side device. At this moment, the network-side device of the first network may determine that the UE is the SNPN UE in a case that the additional NID and/or the index of the NID is not received. Furthermore, a network to which the UE belongs may be determined through the additional NID and/or the index of the MD.

In some implementations, the operation of transmitting, by the terminal, a network identifier of a second network and/or an index of the network identifier includes at least one of the following:

- transmitting the network identifier of the second network and/or the index of the network identifier to a radio access network-side device of the first network through a radio resource control signaling; and
- transmitting the network identifier of the second network and/or the index of the network identifier to a core network-side device of the first network through a non access stratum signaling.

In an implementation, as shown in FIG. 4, the method for providing, by the terminal, the additional NID and/or the index of the NID may specifically include the following steps:

Step 1: A UE provides an NID of a second network and/or an index of the MD to an NG-RAN of a first network through an RRC message. The RRC message may include an NID of the first network and the NID of the second network.

Step 2: The NG-RAN provides the NID of the second network and/or the index of the NM to an AMF of the first network through a first message. The first message may include the NID of the first network and the MD of the second network. The AMF determines a network to which the UE belongs according to the NID of the second network.

In another implementation, as shown in FIG. 5, the UE may provide the MD of the second network and/or the index of the NID to the AMF of the first network through a registration request message of a Non-Access Stratum (NAS). The registration request message may include the MD of the first network and the NID of the second network.

In some implementations, the transmitted network identifier of the second network and/or index of the network identifier is outside the subscriber identity.

In some implementations, a public land mobile network identifier in the subscriber identity in the international mobile subscriber identity format is different from a public land mobile network identifier of the first network accessed by the terminal in a case that the subscriber identity in the international mobile subscriber identity format is adopted.

Therefore, according to the information processing method implemented by the embodiments of this application, a terminal transmits an additional NM of a second network in a case that a subscriber identity in an IMSI format is adopted to access a first network and a second condition is satisfied, whereby a network-side device of the first network may accurately determine a network to which the terminal belongs.

It is to be noted that the executive entity of the information processing method provided by the embodiments of this application may be an information processing apparatus or a control module in the information processing apparatus for performing the information processing method. In the embodiments of this application, the information processing apparatus provided by the embodiments of this application is described by performing the information processing method.

Figure 6:
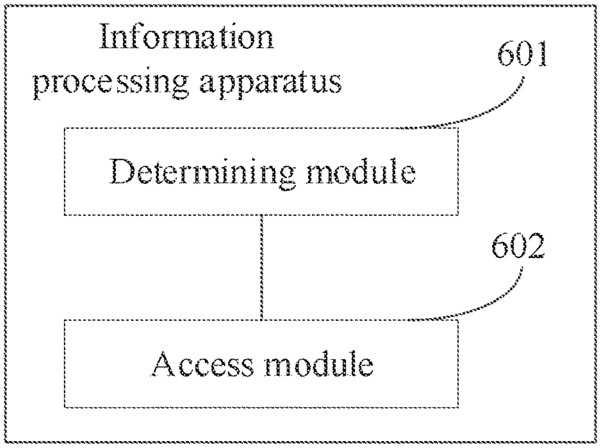
FIG. 6 shows a block diagram of an information processing apparatus according to an embodiment of this application.

FIG. 6 shows a schematic structural diagram of an information processing apparatus according to an embodiment of this application. As shown in FIG. 6, the apparatus includes: a determining module 601 and an access module 602.

The determining module 601 is configured to determine a first format. The access module 602 is configured to transmit a subscriber identity in the first format to a first network. The first network is a network accessed by a terminal, and the first format includes one of the following:

a network access identifier format; and an international mobile subscriber identity format.

Therefore, according to the information processing apparatus implemented by the embodiments of this application, a subscriber identity in a first format is transmitted to a first network for accessing the first network in a case that the first network is to be accessed, whereby a network-side device of the first network may accurately determine a network to which a terminal belongs.

In some implementations, the access module is configured to transmit the subscriber identity in the network access identifier format to the first network in a case that a first condition is satisfied.

In some implementations, the first condition includes at least one of the following:

The first network is a stand-alone non-public network.

The information processing apparatus is a terminal of the second network.

A public land mobile network identifier of the second network is different from a public land mobile network identifier of the first network.

The second network is one of the following: a stand-alone non-public network, a public land mobile network, and an integrated non-public network.

In some implementations, the access module is configured to transmit the subscriber identity in the network access identifier format to the first network in a case that the second network is the stand-alone non-public network or the public land mobile network identifier of the second network is different from the public land mobile network identifier of the first network.

Therefore, according to the information processing apparatus implemented by the embodiments of this application, a subscriber identity in an NAI format is transmitted to a first network in a case that a first condition is satisfied, whereby a network-side device of the first network may accurately determine a network to which a terminal belongs.

In some implementations, the access module is further configured to transmit a network identifier of a second network and/or an index of the network identifier to the first network in a case that the subscriber identity in the international mobile subscriber identity format is adopted and a second condition is satisfied.

The second network is a network to which the terminal belongs.

The network identifier of the second network and a PLMN identifier in the subscriber identity in the international mobile subscriber identity format uniquely identify the second network together, or the network identifier of the second network is a network identifier for identifying information of a stand-alone non-public network.

The index of the network identifier is used for indexing the network identifier of the second network.

In some implementations, the second condition includes at east one of the following:

The first network is a stand-alone non-public network.

The information processing apparatus is a terminal of the second network.

The second network is one of the following: a stand-alone non-public network, a public land mobile network, and an integrated non-public network.

In some implementations, the access module is configured to execute at least one of the following operations:

transmitting the network identifier of the second network and/or the index of the network identifier to a radio access network-side device of the first network through a radio resource control signaling; and transmitting the network identifier of the second network and/or the index of the network identifier to a core network-side device of the first network through a non access stratum signaling.

In some implementations, the transmitted network identifier of the second network and/or index of the network identifier is outside the subscriber identity.

In some implementations, a public land mobile network identifier in the subscriber identity in the international mobile subscriber identity format is different from a public land mobile network identifier of the first network accessed by the terminal in a case that the subscriber identity in the international mobile subscriber identity format is adopted.

Therefore, according to the information processing apparatus implemented by the embodiments of this application, an additional NID of a second network is transmitted in a case that a subscriber identity in an IMSI format is adopted to access a first network and a second condition is satisfied, whereby a network-side device of the first network may accurately determine a network to which a terminal belongs.

The information processing apparatus in the embodiments of this application may be an apparatus, an apparatus or electronic device with an operating system, and a component, an integrated circuit, or a chip in a terminal. The apparatus or electronic device may be a mobile terminal or may be a non-mobile terminal. For example, the mobile terminal may include, but is not limited to, the type of the terminal 11 listed above, and the non-mobile terminal may be a server, a Network Attached Storage (NAS), a personal computer, a television, an automatic teller machine, or a self-service machine, and the like. The embodiments of this application are not specifically limited.

The information processing apparatus provided by the embodiments of this application may implement the processes implemented by the method embodiments of FIG. 2 to FIG. 5 and achieve the same technical effect. To avoid repetition, details are not described herein again.

Figure 7:
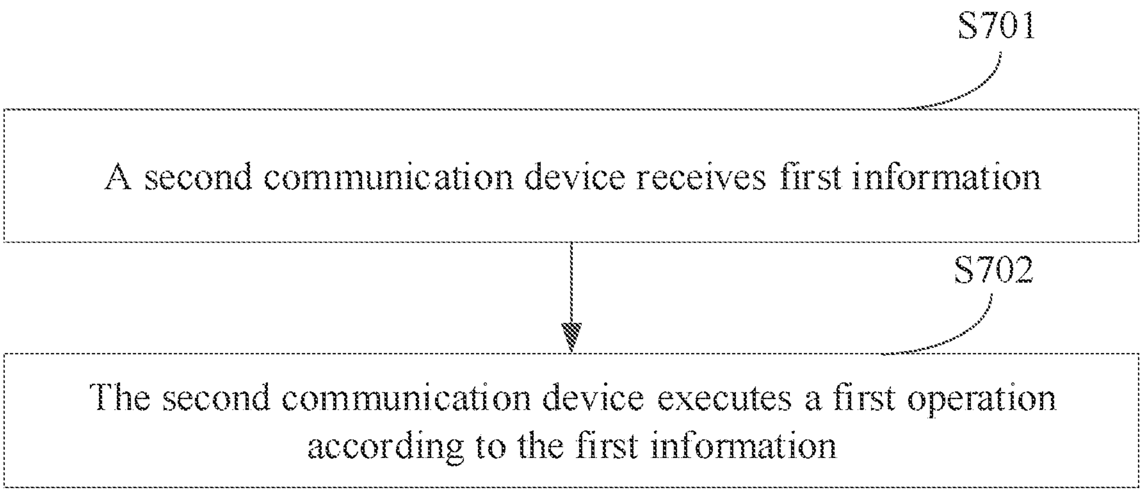
FIG. 7 shows another flowchart of an information processing method according to an embodiment of this application.

FIG. 7 shows another schematic flowchart of an information processing method according to an embodiment of this application. The executive entity of the method is a second communication device. The second communication device may be a communication device of a first network, including a core network device, such as an AMF. In other words, the method may be performed by software or hardware installed in the second communication device. The second communication device may specifically be the network-side device of the first network in the method embodiments of FIGS. 2-5.

S701: The second communication device receives first information.

S702: The second communication device executes a first operation according to the first information.

The first information includes a subscriber identity in a first format of a terminal, and the first format includes one of the following:

a network access identifier format; and an international mobile subscriber identity format.

S701 and S702 may achieve the method embodiments of FIGS. 2-5 and achieve the same and similar technical effects. The repeated parts will not be described herein again.

In an implementation, a UE of the second network may adopt the subscriber identity in the NAI format or the IMSI format for accessing the first network.

In an implementation, a PLMN UE may select the subscriber identity in the NAI format for accessing the first network.

In some implementations, the first operation includes at least one of the following:

determining information for identifying a second network or determining the second network. In some implementations, the first operation includes the discovery and selection of a network function, the discovery and selection of an AUthentication Server Function (AUSF), and the discovery and selection of Unified Data Management (UDM).

The second network is one of the following: a network to which the terminal belongs.

In an implementation, the network to which the terminal belongs includes a subscription network of the terminal.

In an implementation, a network identifier includes an MD for identifying information in a stand-alone non-public network.

Therefore, according to the information processing method implemented by the embodiments of this application, a terminal transmits a subscriber identity in a first format to a first network for accessing the first network in a case that the first network is to be accessed, and a network-side device of the first network determines a network to which the terminal belongs according to the received subscriber identity in the first format, whereby the network-side device of the first network may accurately determine the network to which the terminal belongs.

Based on the foregoing embodiments, in some implementations, in a case that the subscriber identity in the international mobile subscriber identity format is received, the method further includes:

The second communication device executes the first operation based on a public land mobile network identifier in the subscriber identity in the international mobile subscriber identity format in a case that the public land mobile network identifier in the subscriber identity in the international mobile subscriber identity format is different from a public land mobile network identifier of a first network accessed by the terminal.

In some implementations, in a case that the subscriber identity in the international mobile subscriber identity format is received, the method further includes:

The second communication device receives a network identifier of a second network and/or an index of the network identifier.

The second network is a network to which the terminal belongs.

The network identifier of the second network and the public land mobile network identifier in the subscriber identity in the international mobile subscriber identity format uniquely identify the second network together, or the network identifier of the second network is a network identifier for identifying information of a stand-alone non-public network.

The index of the network identifier is used for indexing the network identifier of the second network.

In some implementations, the operation of receiving a network identifier of a second network and/or an index of the network identifier includes at least one of the following:

- receiving the network identifier of the second network and/or the index of the network identifier through a radio resource control signaling;
- receiving the network identifier of the second network and/or the index of the network identifier through a non-access stratum signaling; and
- receiving the network identifier of the second network and/or the index of the network identifier from the terminal or from a radio access network-side device.

In some implementations, the received network identifier of the second network and/or index of the network identifier is outside the subscriber identity.

In some implementations, the operation of determining information for identifying a second network or determining the second network includes at least one of the following:

- determining the information for identifying the second network or determining the second network according to the network identifier of the second network and the received public land mobile network identifier in the subscriber identity in the international mobile subscriber identity format; and
- determining the second network according to the subscriber identity in the network access identifier format.

Therefore, according to the information processing method implemented by the embodiments of this application, a terminal transmits an additional ND of a second network in a case that a subscriber identity in an IMSI format is adopted to access a first network and a second condition is satisfied, and a network-side device of the first network determines a network to which the terminal belongs according to a PLMN ID in the subscriber identity in the IMSI format and the NID of the second network, whereby the network-side device of the first network may accurately determine a network to which the terminal belongs.

It is to be noted that the executive entity of the information processing method provided by the embodiments of this application may be an information processing apparatus or a control module in the information processing apparatus for performing the information processing method. In the embodiments of this application, the information processing apparatus provided by the embodiments of this application is described by performing the information processing method.

Figure 8:
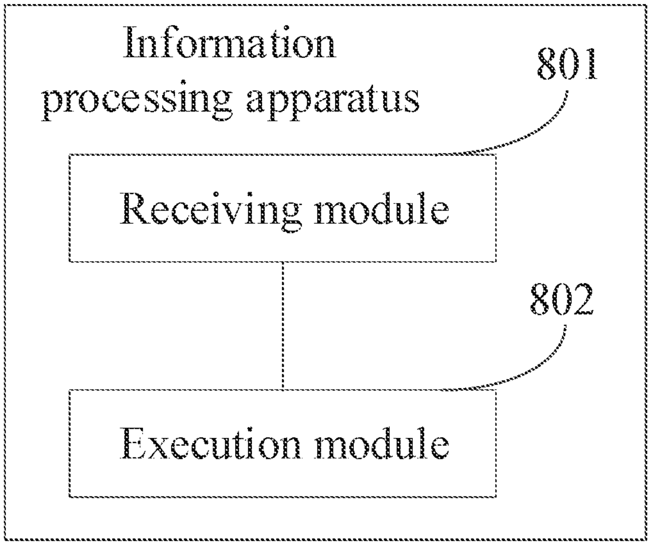
FIG. 8 shows a block diagram of an information processing apparatus according to an embodiment of this application.

FIG. 8 shows another schematic structural diagram of an information processing apparatus according to an embodiment of this application. As shown in FIG. 8, the apparatus includes: a receiving module 801 and an execution module 802.

The receiving module is configured to receive first information.

The execution module is configured to execute a first operation according to the first information.

The first information includes a subscriber identity in a first format of a terminal, and the first format includes one of the following:

- a network access identifier format; and
- an international mobile subscriber identity format.

In some implementations, the first operation includes at least one of the following:

- determining information for identifying a second network or determining the second network.

The second network is one of the following: a network to which the terminal belongs.

Therefore, according to the information processing apparatus implemented by the embodiments of this application, a terminal transmits a subscriber identity in a first format to a first network for accessing the first network in a case that the first network is to be accessed, and a network-side device of the first network determines a network to which the terminal belongs according to the received subscriber identity in the first format, whereby the network-side device of the first network may accurately determine the network to which the terminal belongs.

Based on the foregoing embodiments, in some implementations, in a case that the receiving module is configured to receive the subscriber identity in the international mobile subscriber identity format, the execution module is further configured to:

- execute the first operation based on a public land mobile network identifier in the subscriber identity in the international mobile subscriber identity format in a case that the public land mobile network identifier in the subscriber identity in the international mobile subscriber identity format is different from a public land mobile network identifier of a first network accessed by the terminal.

In some implementations, in a case that the receiving module is configured to receive the subscriber identity in the international mobile subscriber identity format, the receiving module is further configured to receive a network identifier of a second network and/or an index of the network identifier.

The second network is a network to which the terminal belongs.

The network identifier of the second network and the public land mobile network identifier in the subscriber identity in the international mobile subscriber identity format uniquely identify the second network together, or the network identifier of the second network is a network identifier for identifying information of a stand-alone non-public network.

The index of the network identifier is used for indexing the network identifier of the second network.

In some implementations, the receiving module is configured to execute at least one of the following operations:

- receiving the network identifier of the second network and/or the index of the network identifier through a radio resource control signaling;
- receiving the network identifier of the second network and/or the index of the network identifier through a non-access stratum signaling; and receiving the network identifier of the second network and/or the index of the network identifier from the terminal or from a radio access network-side device.

In some implementations, the received network identifier of the second network and/or index of the network identifier is outside the subscriber identity.

In some implementations, the execution module is configured to execute at least one of the following operations:

determining the information for identifying the second network or determining the second network according to the network identifier of the second network and the received public land mobile network identifier in the subscriber identity in the international mobile subscriber identity format; and determining the second network according to the subscriber identity in the network access identifier format.

Therefore, according to the information processing method implemented by the embodiments of this application, a terminal transmits an additional NID of a second network in a case that a subscriber identity in an IMSI format is adopted to access a first network and a second condition is satisfied, and a network-side device of the first network determines a network to which the terminal belongs according to a PLMN ID in the subscriber identity in the IMSI format and the NID of the second network, whereby the network-side device of the first network may accurately determine a network to which the terminal belongs.

The information processing apparatus in the embodiments of this application may be an apparatus, an apparatus or electronic device with an operating system, and a component, an integrated circuit, or a chip in a terminal. The apparatus or electronic device may be a mobile terminal or may be a non-mobile terminal. For example, the mobile terminal may include, but is not limited to, the type of the terminal 11 listed above, and the non-mobile terminal may be a server, an NAS, a personal computer, a television, an automatic teller machine, or a self-service machine, and the like. The embodiments of this application are not specifically limited.

The information processing apparatus provided by the embodiments of this application may implement the processes implemented by the method embodiments of FIG. 7 and achieve the same technical effect. To avoid repetition, details are not described herein again.

Figure 9:
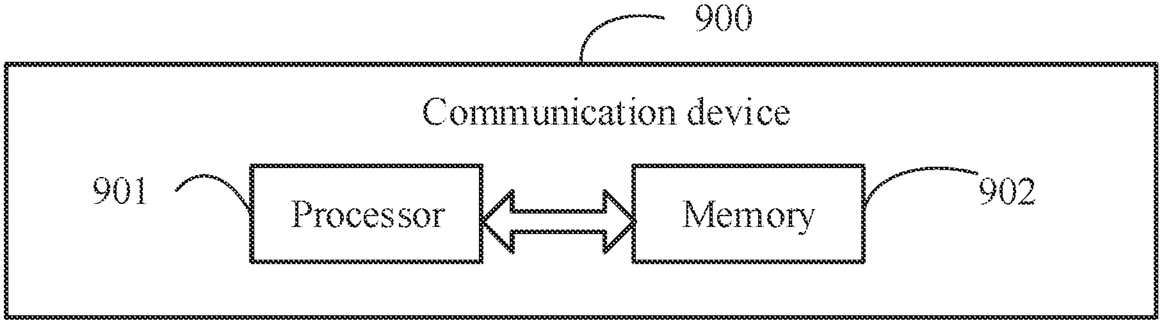
FIG. 9 shows a block diagram of a communication device according to an embodiment of this application.

In some implementations, as shown in FIG. 9, the embodiments of this application further provide a communication device 900, including a processor 901, a memory 902, and programs or instructions stored in the memory 902 and executable on the processor 901, For example, the communication device 900 is a terminal, and the programs or instructions, when executed by the processor 901, implement the various processes of the foregoing information processing method embodiments and achieve the same technical effect. The communication device 900 is a network-side device, and the programs or instructions, when executed by the processor 901, implement the various processes of the foregoing information processing method embodiments and achieve the same technical effect. To avoid repetition, details are not described herein again.

Figure 10:
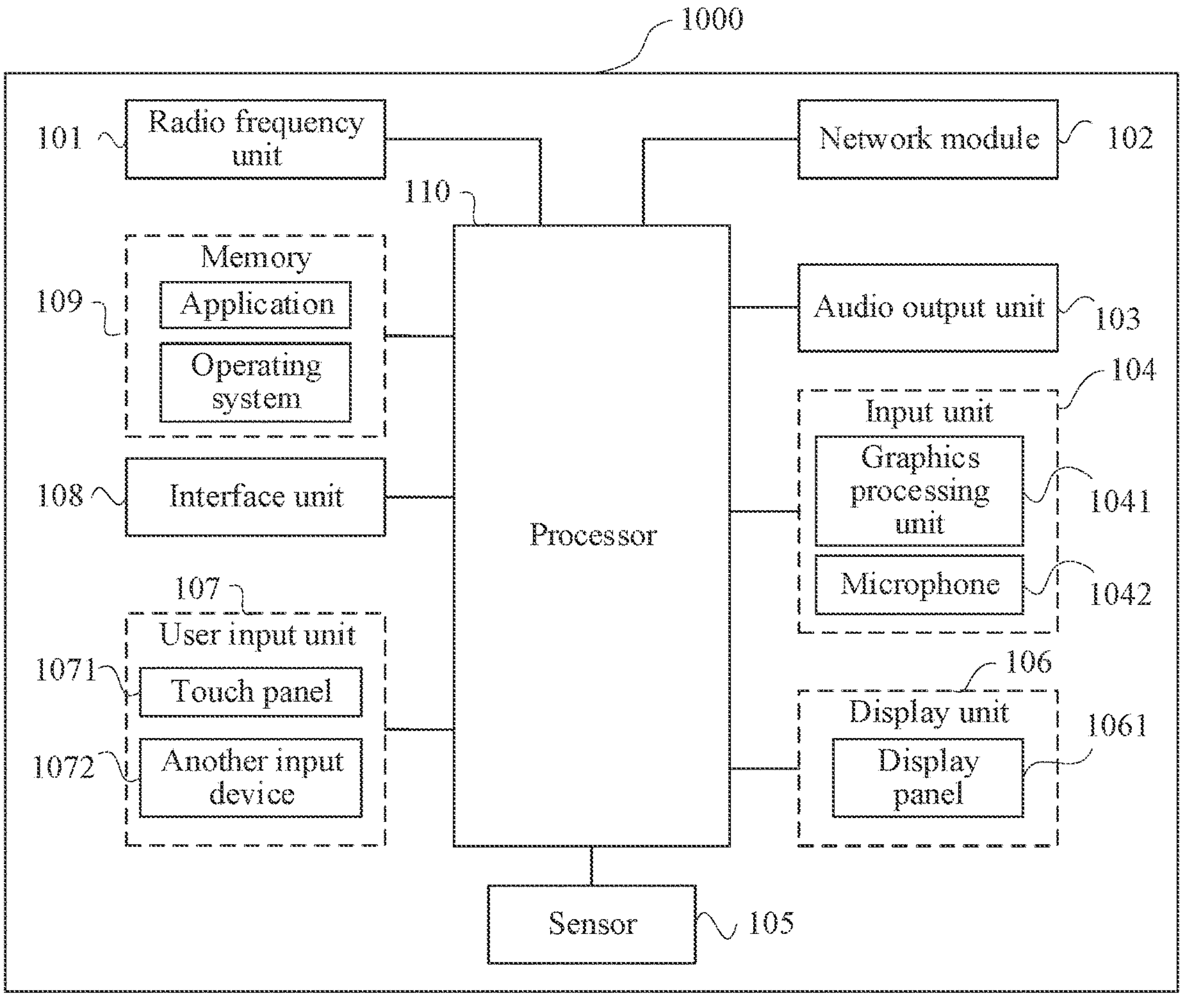
FIG. 10 is a block diagram of a terminal according to an embodiment of this application.

The embodiments of this application further provide a terminal, including a processor and a communication interface. The processor is configured to determine a first format. The communication interface is configured to transmit a subscriber identity in the first format to a first network. The terminal embodiment corresponds to the foregoing terminal-side method, embodiments. Each implementation process and implementation mode of the foregoing method embodiments may be applied to the terminal embodiment, and can achieve the same technical effect. Specifically, FIG. 10 is a schematic diagram of a hardware structure of a terminal according to an embodiment of this application.

The terminal 1000 includes, but is not limited to: at least some components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the terminal 100 may further include a power supply (such as a battery) for supplying power to the components. The power supply may be logically connected to the processor 110 by a power management system, thereby implementing functions such as charging, discharging, and power consumption management by using the power management system. The terminal structure shown in FIG. 10 does not constitute a limitation on the terminal, and the terminal may include more or fewer components than shown, or combine some components, or have different component arrangements, which are not described herein in detail.

It is to be understood that in the embodiments of this application, the input unit 104 may include a Graphics Processing Unit (GPU) 1041 and a microphone 1042. The graphics processing unit 1041 performs processing on image data of a static picture or a video that is obtained by an image acquisition apparatus (for example, a camera) in a video acquisition mode or an image acquisition mode. The display unit 106 may include a display panel 1061. The display panel 1061 may be configured in the form of a liquid crystal display, an organic light-emitting diode, or the like. The user input unit 107 includes a touch panel 1071 and another input device 1072. The touch panel 1071 is also referred to as a touch screen. The touch panel 1071 may include two parts: a touch detection apparatus and a touch controller. The another input device 1072 may include, but not limited to, a physical keyboard, a functional key (such as a volume control key or a switch key), a track ball, a mouse, and a joystick, which are not described herein in detail.

In the embodiments of this application, the radio frequency unit 101 receives downlink data from a network-side device and then transmits the downlink data to the processor 110 for processing. In addition, uplink data is transmitted to the network-side device. Generally, the radio frequency unit 101 includes, but is not limited to, an antenna, at least one amplifier, a transceiver, a coupler, a low noise amplifier, a duplexer, and the like.

The memory 109 may be configured to store software programs or instructions and various data. The memory 109 may mainly include a program or instruction storage area and a data storage area. The program or instruction storage area may store an operating system, applications or instructions required by at least one function (for example, a sound playback function and an image display function), and the like. In addition, the memory 109 may include a high-speed random access memory and may further include a non-volatile memory. The non-volatile memory may be a Read-Only Memory (ROM), a Programmable ROM (PROM), an Erasable PROM (EPROM), an Electrically EPROM (EEPROM), or a flash memory. For example, the memory is at least one magnetic disk storage device, a flash memory device, or another non-volatile solid-state storage device.

The processor 110 may include one or more processing units. In some implementations, the processor 110 may integrate an application processor and a modem processor, where the application processor mainly processes an operating system, a user interface, application programs or instructions, and the like, and the modem processor mainly processes wireless communication such as a baseband processor. It may be understood that the modem processor may not be integrated into the processor 110.

The radio frequency unit 101 is configured to transmit a subscriber identity in a first format to a first network.

The first network is a network accessed by a terminal.

The first format includes one of the following:

a network access identifier format; and an international mobile subscriber identity format.

Therefore, a network-side device of the first network may accurately determine a network to which the terminal belongs.

In some implementations, the radio frequency unit 101 is further configured to transmit the subscriber identity in the network access identifier format to the first network in a case that a first condition is satisfied.

In some implementations, the first condition includes at least one of the following:

The first network is a stand-alone non-public network.

The information processing apparatus is a terminal of the second network.

A public land mobile network identifier of the second network is different from a public land mobile network identifier of the first network.

The second network is one of the following: a stand-alone non-public network, a public land mobile network, and an integrated non-public network.

In some implementations, the radio frequency unit 101 is configured to transmit the subscriber identity in the network access identifier format to the first network in a case that the second network is the stand-alone non-public network or the public land mobile network identifier of the second network is different from the public land mobile network identifier of the first network.

Therefore, a network-side device of the first network may accurately determine a network to which the terminal belongs.

In some implementations, the radio frequency unit 101 is further configured to transmit a network identifier of a second network and/or an index of the network identifier to the first network in a case that an access module adopts the subscriber identity in the international mobile subscriber identity format and a second condition is satisfied.

The second network is a network to which the terminal belongs.

The network identifier of the second network and a PLMN identifier in the subscriber identity in the international mobile subscriber identity format uniquely identify the second network together, or the network identifier of the second network is a network identifier for identifying information of a stand-alone non-public network.

The index of the network identifier is used for indexing the network identifier of the second network.

In some implementations, the second condition includes at least one of the following:

The first network is a stand-alone non-public network.

The information processing apparatus is a terminal of the second network.

The second network is one of the following: a stand-alone non-public network, a public land mobile network, and an integrated non-public network.

In some implementations, the radio frequency unit 101 is configured to execute at least one of the following operations:

transmitting the network identifier of the second network and/or the index of the network identifier to a radio access network-side device of the first network through a radio resource control signaling; and transmitting the network identifier of the second network and/or the index of the network identifier to a core network-side device of the first network through a non-access stratum signaling.

In some implementations, the transmitted network identifier of the second network and/or index of the network identifier is outside the subscriber identity.

Therefore, a network-side device of the first network may accurately determine a network to which the terminal belongs.

The embodiments of this application further provide a network-side device, including a processor and a communication interface. The processor is configured to execute a first operation according to first information. The communication interface is configured to receive the first information. The network-side device embodiment corresponds to the foregoing network-side device method embodiments. Each implementation process and implementation mode of the foregoing method embodiments may be applied to the network-side device embodiment, and can achieve the same technical effect.

Figure 11:
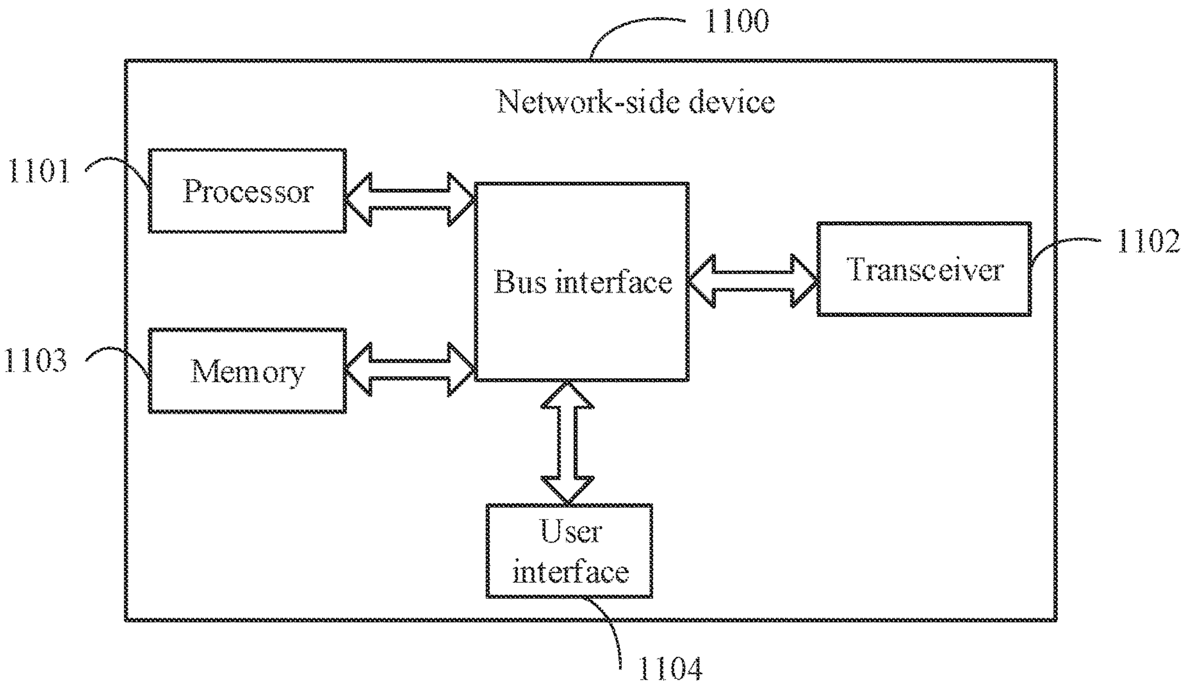
FIG. 11 is a block diagram of a network-side device according to an embodiment of this application.

In some implementations, the embodiments of this application further provide a network-side device. As shown in FIG. 11, a network device 1100 includes: a processor 1101, a transceiver 1102, a memory 1103, a user interface 1104, and a bus interface.

In the embodiments of the present invention, the network-side device 1100 further includes: computer programs stored in the memory 1103 and executable on the processor 1101. The computer programs are executed by the processor 1101 to perform the method performed by, each module shown in FIG. 8 and to achieve the same technical effect. To avoid repetition, details are not described herein again.

In FIG. 11, a bus architecture may include any quantity of interconnected buses and bridges, and specifically connects together circuits that are of one or more processors represented by the processor 1101 and of a memory represented by the memory 1103. The bus architecture may further connect various other circuits of a peripheral, a voltage regulator, a power management circuit, and the like. This is well known in the art, and therefore, no further description is provided in this specification. The bus interface provides an interface. The transceiver 1102 may be a plurality of components, including a transmitter and a receiver, and providing units for communicating with various other apparatuses on a transmission medium. For different user equipment, the user interface 1104 may be an interface capable of externally or internally connecting a required device. The connected device includes, but not limited to, a keypad, a display, a speaker, a microphone, and joystick.

The processor 1101 is responsible for the management of the bus architecture and normal processing, and the memory 1103 may store data used when the processor 1101 executes an operation.

The embodiments of this application further provide a readable storage medium. The readable storage medium stores programs or instructions. The programs or instructions, when executed by a processor, implement the various processes of the foregoing information processing method embodiments and achieve the same technical effect. To avoid repetition, details are not described herein again.

The processor is a processor in the terminal in the foregoing embodiments. The readable storage medium includes a computer-readable storage medium such as a Read-Only Memory (ROM), a Random Access Memory (RAM), a magnetic disk, or an optical disc.

The embodiments of this application also provide a chip. The chip includes a processor and a communication interface. The communication interface is coupled to the processor. The processor is configured to execute programs or instructions to implement the various processes of the foregoing information processing method embodiments and achieve the same technical effect. To avoid repetition, details are not described herein again.

It is to be understood that the chip referred to in the embodiments of this application may also be referred to as a system-on-chip, and the like.

It is to be noted that the terms "include," "comprise," or any other variation thereof in this specification is intended to cover a non-exclusive inclusion, whereby a process, method, object, or apparatus including a series of elements not only includes those elements, but also includes other elements that are not explicitly listed, or also includes elements inherent to such process, method, object, or apparatus. Without more limitations, elements defined by the sentence "including a" does not exclude that there are still other same elements in the process, method, object, or apparatus. Furthermore, it is to be noted that the scope of the methods and apparatuses in the implementations of this application is not limited to performing functions in the order shown or discussed, but may also include performing functions in a substantially simultaneous manner or in reverse order depending on the functions involved. For example, the described methods may be performed in a different order than described, and various steps may be added, omitted, or combined. In addition, features described in some examples may also be combined in other examples.

According to the descriptions in the above implementations, a person skilled in the art may clearly learn that the method according to the foregoing embodiments may be implemented by relying on software and a general hardware platform or by using hardware. Based on such an understanding, the technical solutions of this application essentially, or the part contributing to the prior art, may be presented in the form of a computer software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the various embodiments of this application.

The embodiments of this application have been described above with reference to the accompanying drawings. This application is not limited to the foregoing specific implementations, and the foregoing specific implementations are merely exemplary and not imitative. A person of ordinary skill in the art may make various forms under the teaching of this application without departing from the spirit of this application and the protection scope of the claims, and such forms shall all fall within the protection scope of this application.

What is claimed is:

1. An information processing method, comprising:

transmitting, by a first communication device, a subscriber identity in a first format to a first network, wherein the first network is a network accessed by a terminal of a second network, wherein when a Public Land Mobile Network (PLMN) identifier of the second network is identical to a PLMN identifier of the first network, the first format is a network access identifier format, wherein the first communication device is the terminal of the second network, or wherein when the first format is an international mobile subscriber identity format, the PLMN identifier of the second network is different from the PLMN identifier of the first network.

2. The information processing method according to claim 1, wherein the transmitting the subscriber identity in the first format to the first network comprises:

transmitting the subscriber identity in the network access identifier format to the first network when a first condition is satisfied, wherein the first condition comprises:

the first network is a stand-alone non-public network, and wherein the second network is one of following: a stand-alone non-public network, a PLMN, or an integrated non-public network.

3. The information processing method according to claim 1, wherein the subscriber identity is transmitted only in the network access identifier format to the first network when the second network is a stand-alone non-public network.

4. The information processing method according to claim 1, wherein when the first format is the international mobile subscriber identity format, the information processing method further comprises:

transmitting, by the first communication device, a network identifier of the second network or an index of the network identifier to the first network when a second condition is satisfied, wherein the second condition comprises at least one of following:

the first network is a stand-alone non-public network; or the first communication device is the terminal of the second network, wherein the second network is one of following: a stand-alone non-public network, a PLMN, or an integrated non-public network.

5. The information processing method according to claim 4, wherein the second network is a network to which the terminal belongs, wherein the network identifier of the second network and a identifier in the subscriber identity in the international mobile subscriber identity format uniquely identify the second network together, or the network identifier of the second network is a network identifier for identifying information of a stand-alone non-public network, and wherein the index of the network identifier is used for indexing the network identifier of the second network.

6. The information processing method according to claim 4, wherein the transmitting the network identifier or the index of the network identifier of the second network to the first network comprises at least one of following:

transmitting the network identifier or the index of the network identifier of the second network to a radio access network-side device of the first network through a radio resource control signaling; or transmitting the network identifier or the index of the network identifier of the second network to a core network-side device of the first network through a non-access stratum signaling.

7. The information processing method according to claim 6, wherein the transmitted network identifier or index of the network identifier of the second network is outside the subscriber identity.

8. The information processing method according to claim 1, wherein a PLMN identifier in the subscriber identity in the international mobile subscriber identity format is different from the PLMN identifier of the first network accessed by the terminal when the first format is the international mobile subscriber identity format.

9. An information processing method, comprising:

receiving, by a second communication device, first information; and executing, by the second communication device, a first operation according to the first information, wherein the first information comprises a subscriber identity in a first format of a terminal, wherein when a Public Land Mobile Network (PLMN) identifier of a second network is identical to a PLMN identifier of a first network accessed by the terminal, the first format is a network access identifier format, or wherein when the first format is an international mobile subscriber identity format, the PLMN identifier of the second network is different from the PLMN identifier of the first network.

10. The information processing method according to claim 9, wherein when the first format is the international mobile subscriber identity format, the information processing method further comprises:

executing, by the second communication device, the first operation based on a PLMN identifier in the subscriber identity in the international mobile subscriber identity format when the PLMN identifier in the subscriber identity in the international mobile subscriber identity format is different from the PLMN identifier of the first network accessed by the terminal.

11. The information processing method according to claim 9, wherein when the first format is the international mobile subscriber identity format, the information processing method further comprises:

receiving, by the second communication device, a network identifier or an index of the network identifier of the second network, wherein the second network is a network to which the terminal belongs, wherein the network identifier of the second network and the PLMN identifier in the subscriber identity in the international mobile subscriber identity format uniquely identify the second network together, or the network identifier of the second network is a network identifier for identifying information of a stand-alone non-public network, and wherein the index of the network identifier is used for indexing the network identifier of the second network.

12. The information processing method according to claim 9, wherein the first operation comprises at least one of following:

determining information for identifying the second network or determining the second network; or the second network is a network to which the terminal belongs.

13. A terminal, comprising: a memory storing computer-readable instructions; and a processor coupled to the memory and configured to execute the computer-readable instructions, wherein the computer-readable instructions, when executed by the processor, cause the processor to:

transmit, by a first communication device, a subscriber identity in a first format to a first network, wherein the first network is a network accessed by the terminal, wherein when a Public Land Mobile Network (PLMN) identifier of a second network is identical to a PLMN identifier of the first network, the first format is a network access identifier format, wherein the first communication device is the terminal that belongs to the second network, or wherein when the first format is an international mobile subscriber identity format, the PLMN identifier of the second network is different from the PLMN identifier of the first network.

14. The terminal according to claim 13, wherein the transmitting the subscriber identity in the first format to the first network comprises:

transmitting the subscriber identity in the network access identifier format to the first network when a first condition is satisfied, wherein the first condition comprises:

the first network is a stand-alone non-public network, and wherein the second network is one of following: a stand-alone non-public network, a PLMN, or an integrated non-public network.

15. The terminal according to claim 13, wherein the subscriber identity is transmitted only in the network access identifier format to the first network when the second network is the stand-alone non-public network.

16. The terminal according to claim 13, wherein when the first format is the international mobile subscriber identity format, the operations further comprise:

transmitting, by the first communication device, a network identifier or an index of the network identifier of the second network to the first network when a second condition is satisfied, wherein the second condition comprises at least one of following:

the first network is a stand-alone non-public network; or the first communication device is the terminal that belongs to the second network, and wherein the second network is one of following: a stand-alone non-public network, a PLMN, or an integrated non-public network.

17. The terminal according to claim 16, wherein the second network is a network to which the terminal belongs, wherein the network identifier of the second network and a PLMN identifier in the subscriber identity in the international mobile subscriber identity format uniquely identify the second network together, or the network identifier of the second network is a network identifier for identifying information of a stand-alone non-public network, and wherein the index of the network identifier is used for indexing the network identifier of the second network.

18. The terminal according to claim 16, wherein the transmitting the network identifier or the index of the network identifier of the second network to the first network comprises at least one of following:

transmitting the network identifier or the index of the network identifier of the second network to a radio access network-side device of the first network through a radio resource control signaling; or transmitting the network identifier or the index of the network identifier of the second network to a core network-side device of the first network through a non-access stratum signaling.

19. The terminal according to claim 18, wherein the transmitted network identifier or index of the network identifier of the second network is outside the subscriber identity.

20. The terminal according to claim 13, wherein a PLMN identifier in the subscriber identity in the international mobile subscriber identity format is different from the PLMN identifier of the first network accessed by the terminal when the first format is the international mobile subscriber identity format.

* * * * *